United States Patent [19]

Stenström

[11] Patent Number: 4,703,385
[45] Date of Patent: Oct. 27, 1987

[54] PROTECTIVE CIRCUIT FOR SERIES CAPACITOR BANKS

[75] Inventor: Lennart Stenström, Ludvika, Sweden
[73] Assignee: Asea Aktiebolag, Sweden
[21] Appl. No.: 854,918
[22] Filed: Apr. 23, 1986
[51] Int. Cl.⁴ .............................................. H02H 7/16
[52] U.S. Cl. ...................................... 361/16; 361/56; 361/91
[58] Field of Search ....................... 361/15–17, 361/56, 57, 86, 91, 111, 10, 103, 129, 130

[56] References Cited

U.S. PATENT DOCUMENTS 4,174,529 11/1979 Hamann ................................. 361/16
4,432,029 2/1984 Lundqvist ............................. 361/16

FOREIGN PATENT DOCUMENTS 2227397 3/1974 Fed. Rep. of Germany .
2211782 7/1974 France .
2544923 10/1984 France .

Primary Examiner—A. D. Pellinen
Assistant Examiner—Todd E. DeBoer
Attorney, Agent, or Firm—Watson, Cole et al.

[57] ABSTRACT

As overvoltage protection for a series capacitor (C1–C5) in a high-voltage network a voltage-dependent resistor (Z6), built up of metal oxide varistors, is arranged in parallel with the capacitor. In parallel with the resistor there is a spark gap means consisting of two series-connected spark gaps (G1, G2) for shunting the resistor in case of overload thereof. The energy for triggering the spark gap means is obtained from an auxiliary capacitor (C5), which is charged during operation, and is supplied to one of the spark gaps (G2) via a switching means (T1, T2), controlled by an overload detector (CU), and a pulse transformer (TR). A metal oxide varistor (Z5) is connected in series with the high voltage winding of the transformer. The transformer is connected so that the triggering pulse is in opposition to the voltage across the series capacitor.

6 Claims, 1 Drawing Figure

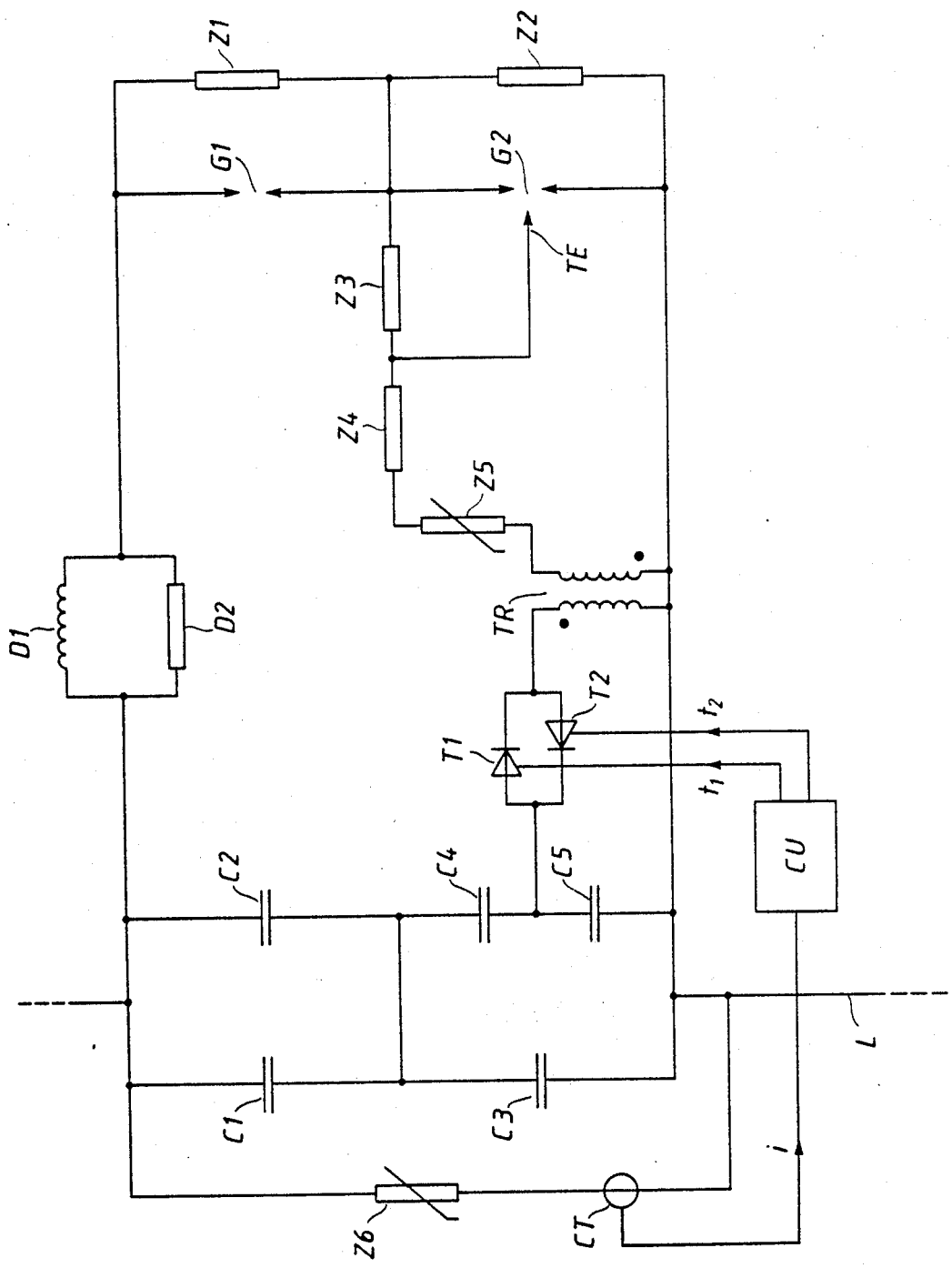

PROTECTIVE CIRCUIT FOR SERIES CAPACITOR BANKS

TECHNICAL FIELD

The present invention relates to a protective circuit for a series capacitor bank in a high-voltage network. The protective circuit comprises a voltage-dependent resistor arranged in parallel with the capacitor bank, a spark gap means arranged in parallel with the resistor for shunting the resistor in case of overload thereof, an overload detector for directly or indirectly sensing the temperature of the resistor, and a pulse transformer for generating high-voltage pulses for triggering the spark gap mesns. The low-voltage winding of the transformer is connected to an auxiliary capacitor, which is charged during operation, via a normally open switching means which is controlled hy the overload detector in such a way that it is closed if the temperature and energy absorption of the resistor or the current through the resistor exceeds a predetermined level for triggering the spark gap means. The voltage-dependent resistor is preferably built up of zinc oxide varistors.

BACKGROUND ART

For protection of a series capacitor it is known to arrange, in parallel with the capacitor, a voltage-dependent resistor means built up of metal oxide varistors in the form of ceramic blocks. A protective spark gap provided with means for forced triggering is usually arranged in parallel with this resistor means. The cost of the resistor is kept low by dimensioning the resistor to absorb only a limited amount of energy. When the absorbed energy exceeds the level which is predetermined by the dimensioning, the parallel spark gap is activated and is later extinguished by external interruption of the current or shunting. Various triggering devices for a protective spark gap of the kind mentioned are known. In a device disclosed in U.S. Pat. No. 4,174,529 the energy for triggering the spark gap is taken from a current transformer arranged in series with the resistor. Since the triggering may reguire a relatively high power, this trsnsformer will have a high rated power and is therefore expensive. In other known devices (see U.s. Pat. No. 4,625,245), special triggering circuits with auxiliary spark gaps of the kind used in older surge arresters with silicon carbide varistors are used. Since modern surge arresters are built up of zinc oxide varistors without series-connected spark gaps, the need for these spark gaps has considerably decreased. This has led to a situation in which there is no longer any market for a rational manufacture of such spark gaps. The aim is therefore to avoid the use of auxiliary spark gaps also in protective circuits of the kind to which the present invention relates.

DISCLOSURE OF THE INVENTION

The present invention aims to provide a protective circuit of the above-mentioned kind which is relatively simple and reliable in operation and in which the triggering of the spark gap takes place directly without the use of auxiliary spark gaps. This is achieved according to the invention by a protective circuit which is characterized in that its spark gap means comprises at least two series-connected spark gaps with control impedances and in that the high voltage winding of the transformer is connected, in series with a metal oxide varistor, across one spark gap and its control impedance, the transformer being connected so that the high voltage pulse generated by the transformer is in opposition to the voltage across the capacitor bank.

In a protective circuit of this kind, a reliable triggering of the main spark gaps is obtained in a simple manner without having to resort to special triggering circuits with auxiliary spark gaps.

BRIEF DESCRIPTION OF THE DRAWING

The invention will be explained in greater detail by describing an embodiment with reference to the accompanying single FIGURE, which is a circuit diagram of a series capacitor protective circuit.

DESCRIPTION OF THE PREFERRED EMBODIMENT

The drawing shows a series capacitor bank C1–C5, which is connected into a high voltage line L. The capacitor bank is only schematically shown and in reality each one of the capacitors C1–C5 may consist of a larger number of series- and/or parallel-connected capacitor units. For protection of the capacitor bank against overvoltages, a voltage-dependent resistor Z6, built up of zinc oxide varistors, is arranged in parallel with the bank. The resistor Z6 can only take up a limited amount of energy, and to protect the resistor Z6 against overload, a triggered spark gap means consisting of two series-connected spark gaps G1, G2 is arranged in parallel with the resistor Z6. These spark gaps G1, G2 may suitably consist of ball spark gaps and are dimensioned to withstand relatively high currents (e.g. 40 kA) with a relatively long duration (e.g. 0.2 s). The voltage division between the spark gaps is brought about by means of control impedances Z1, Z2 consisting of capacitors or non-linear resistors. Spark gaps of this kind are often enclosed in a metallic casing, in which the connection to one spark gap electrode is made via a capacitor bushing. In such cases the necessary voltage division can possibly be obtained through the capacitor bushings without the need to use separate control impedances. The spark gap G2 is provided with an ignition electrode TE.

A damping circuit D1, D2 is arranged in series with the spark gap means G1, G2 to limit the amplitude of the capacitor current when the spark gaps are ignited. Similarly, in a manner known per se a by-pass circuit-breaker can be arranged in parallel with the spark gap means, said bypass circuit-breaker being closed a certain time after the spark gaps have been ignited, the gaps thus being protected against overload.

A pulse transformer TR has its high voltage winding connected to the spark gap G2 via a zinc oxide varistor Z5 and two resistors $Z_3$ and $Z_4$, which may either be linear resistors or non-linear resistors with a low exponent, for example silicon carbide varistors. The low voltage winding of the transformer TR is connected, via a switching means T1, T2, to a capacitor C5 included in the capacitor bank. The switching means T1, T2 may consist of two antiparallel-connected thyristors, as shown in the FIGURE. Alternatively, however, some other switching means can be used, for example a triac, that is, a thyristor which is controllable in both directions.

Initiation of the triggering of the spark gaps takes place with the aid of an overload detector CU which directly or indirectly senses the temperature of the resistor Z6, the energy absorbed by the resistor Z6, or the current through the resistor Z6. For this purpose a signal i is used, which is proportional to the current through the resistor Z6 snd which is obtained with the aid of a current transformer CT connected in series with the resistor Z6.

When the temperature of the resistor Z6, or when the energy absorbed by the resistor Z6 during the occurrence of a fault exceeds a predetermined level, firing pulses $t_1$ and $t_2$ from the overload detector CU are supplied to the thyristors T1 and T2. This results in an output voltage pulse from the high voltage winding of the transformer TR. The connection of the transformer TR is chosen so that this voltage is in opposition to the voltage across the series capacitor C1–C5. Because of the heavy non-linearity of the ZnO varistor Z5, the voltage pulse causes only a small voltage increase across Z5. Instead the voltage is forced down across the control impedance Z2 and further towards the opposite polarity. The voltage across the control impedance Z1 therefore increases until the spark gap G1 is ignited. The current is then limited through the impedances Z3, Z4 and Z5 to a few 100 A before the spark gap G2 is ignited. To facilitate the ignition of G2, a triggering electrode TE is connected across the impedance Z3. The impedances Z3 and Z4 have a lower exponent than Z5, so the voltage prior to ignition of the spark gap G1 is subtantially taken up by Z5. When the current increases greatly after ignition of G1, the voltage increases also across the impedance Z3 until the triggering electrode TE is ignited and ionizes the gap G2, which facilitates the ignition of this gap.

During normal system voltage, the zinc oxide varistor Z5 operates in principle as a capacitor, which is so small that it does not affect the voltage division between the apark gaps.

The invention is not limited to the embodiment shown, but several modification are feasible within the scope of the claims. For example, the resistor Z3 and the ignition electrode TE of the spark gap G2 are not absolutely necessary. Further, the capacitor C5 need not be included directly in the series capacitor bank but may alternatively be constituted by a separately arranged capacitor unit.

What is claimed is:

1. A protective circuit used in a series capacitor bank in a high voltage network, said circuit comprising:
    a voltage-dependent resistor connected in parallel with said capacitor bank,
    a spark gap circuit means for shunting the latter in case of overload thereof, said circuit means including at least two-series-connected spark gaps each provided with control impedances,
    an overload detector for said resistor,
    a pulse transformer for generating a high voltage pulse for triggering said spark gap means in case of resistor overload, said transformer having a low voltage winding and a high voltage winding,
    an auxiliary capacitor adapted to be charged during overload operation of the protective circuit,
    a switching means,
    said low voltage transformer winding being connected to said auxiliary capacitor through said switching means for charging said auxiliary capacitor upon closing of said switching means,
    said switching means being open during normal operation and being controlled by said overload detector in such a way that it closes in response to the resistor overload condition for triggering said spark gap means,
    said high voltage traneformer winding being connected in series with a resistor means across one of said spark gaps and its control impedance, said resistor means including a metal oxide varistor, and
    said transformer being so connected within the circuit that said generated high voltage pulse is in opposition to the voltage across the capacitor bank.

2. A protective circuit according to claim 1, wherein at least one linear resistor is connected in series with the metal oxide varistor in the high voltage winding of the pulse transfomer.

3. A protective circuit according to claim 1, wherein at least one non-linear resistor is connected in series with the metal oxide varistor in the high voltage winding of the pulse transformer, said non-linear resistor being less voltage-dependent than the metal oxide varistor.

4. A protective circuit according to claim 1, wherein the spark gap across which the high voltage winding of the transformer is connected is provided with a triggering electrode, which is connected to a point located between two series-connected resistors in the high voltage circuit of the transformer.

5. A protective circuit as in any of the preceding claims, wherein said auxiliary capacitor is included in the series capacitor bank.

6. A protective circuit according to claim 1, wherein the switching means consists of a thyristor connection which is controllable in both directions.

* * * * *